(12) United States Patent
Stridsberg

(10) Patent No.: US 6,756,582 B2
(45) Date of Patent: Jun. 29, 2004

(54) POSITION TRANSDUCER

(75) Inventor: Lennart Stridsberg, Stockholm (SE)

(73) Assignee: Stridsberg Innovation AB, Stockholm (SE)

( * ) Notice: Subject to any disclaimer, the term of this patent is extended or adjusted under 35 U.S.C. 154(b) by 0 days.

(21) Appl. No.: 10/423,931

(22) Filed: Apr. 28, 2003

(65) Prior Publication Data
US 2003/0213896 A1 Nov. 20, 2003

Related U.S. Application Data

(63) Continuation of application No. PCT/SE01/02313, filed on Oct. 22, 2001.

(30) Foreign Application Priority Data

| Oct. 22, 2000 | (SE) | 0003866 |
| Oct. 25, 2000 | (SE) | 0003954 |
| Oct. 26, 2000 | (SE) | 0003955 |
| Dec. 17, 2000 | (SE) | 0004717 |
| Feb. 28, 2001 | (SE) | 0100715 |
| Apr. 3, 2001 | (SE) | 0101222 |

(51) Int. Cl.$^7$ .............................................. G01D 5/34
(52) U.S. Cl. .................... 250/231.13; 341/13
(58) Field of Search ............... 250/231.13, 231.14, 250/231.15, 231.16, 231.17, 231.18; 341/11, 13, 15

(56) References Cited

U.S. PATENT DOCUMENTS

| 4,346,447 A | 8/1982 | Takahama |
| 5,065,095 A | 11/1991 | Suzuki |
| 5,721,546 A | 2/1998 | Tsutsumishita |
| 6,084,234 A | 7/2000 | Stridsberg |
| 6,191,415 B1 * | 2/2001 | Stridsberg ............... 250/231.13 |

FOREIGN PATENT DOCUMENTS

| EP | 0 200 791 A1 | 11/1986 |
| EP | 0 331 189 A2 | 9/1989 |
| EP | 1 046 884 A1 | 10/2000 |

* cited by examiner

Primary Examiner—Kevin Pyo
(74) Attorney, Agent, or Firm—Birch, Stewart, Kolasch & Birch, LLP

(57) ABSTRACT

An encoder for detecting the angular position of a shaft of an electric motor comprises an encoder disc (101) having tracks (515) sensed by detectors in reading heads (106a, 106b). Analog position signals from the detectors are sampled in sampling circuits (1701–1704) at times given by sampling pulses issued by a device such as a counter (506). The sampled analog values are converted to digital values by a converter (1706) and provided to a local processor (1707) calculating position values. The local processor sends commands to the device (506) to issue sampling pulses at accurately defined times, normally regularly spaced in time. The local processor also receives, from a central processor, read command signals commanding to it provide position values. These read command signals normally arrive rather regularly but are not synchronised. In order to provide positions values at suitable times after receiving the read command signals, the local processor can send its commands earlier or later, in relation to the normal regular rate.

10 Claims, 8 Drawing Sheets

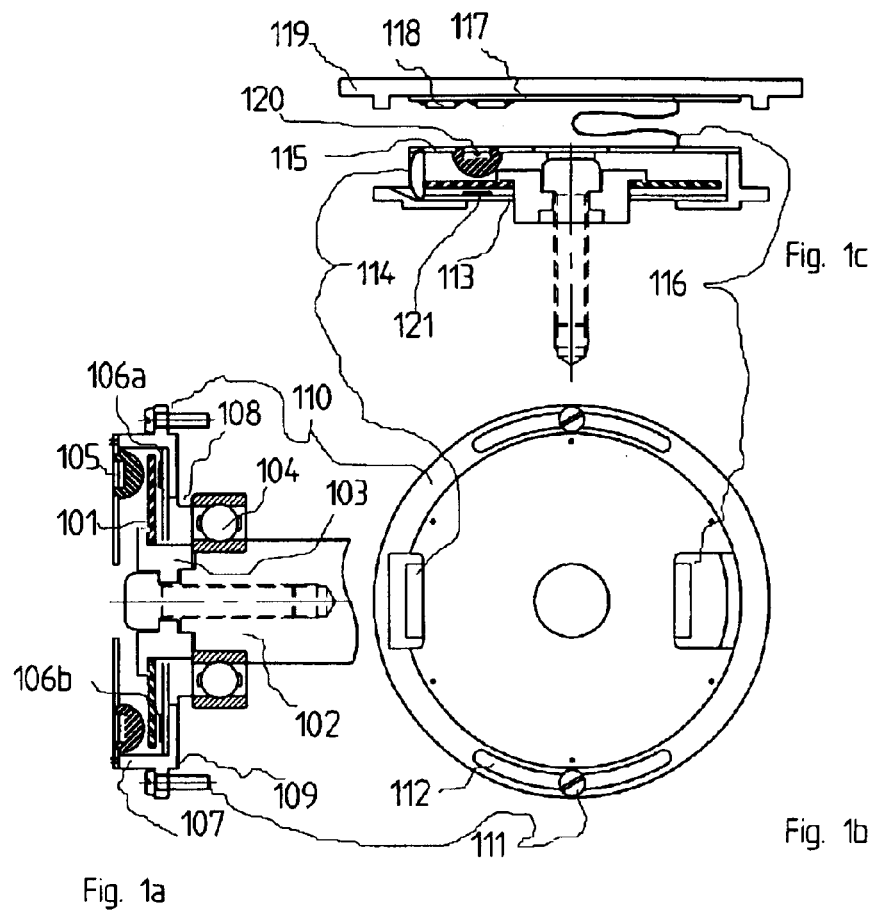
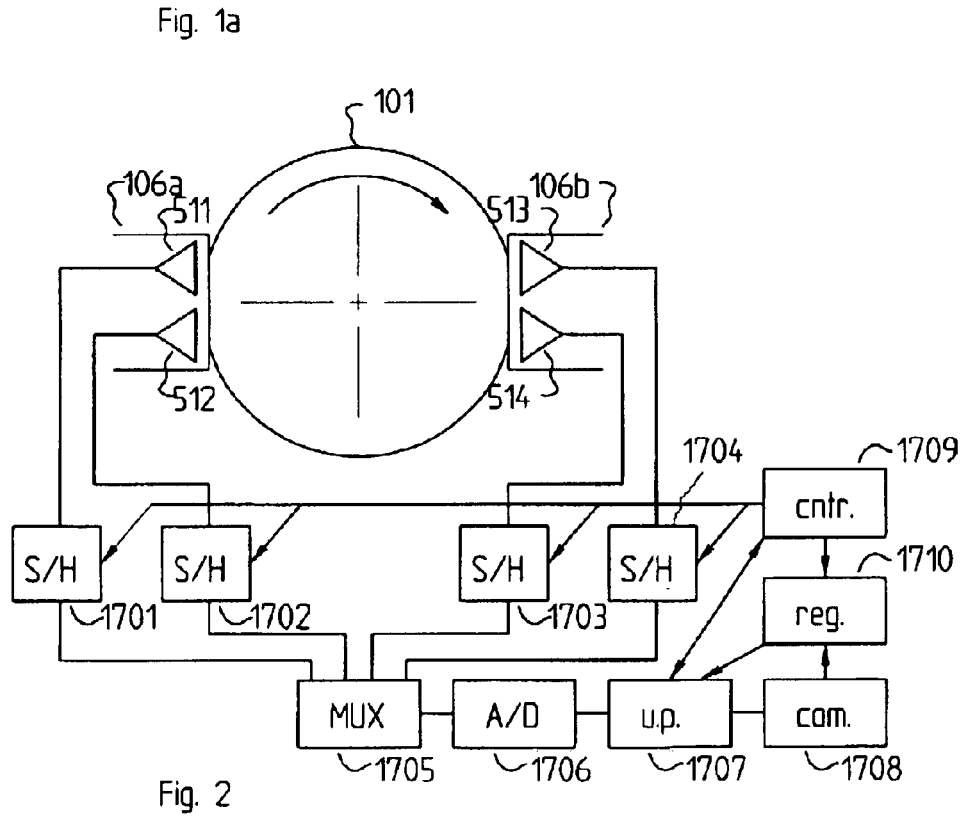

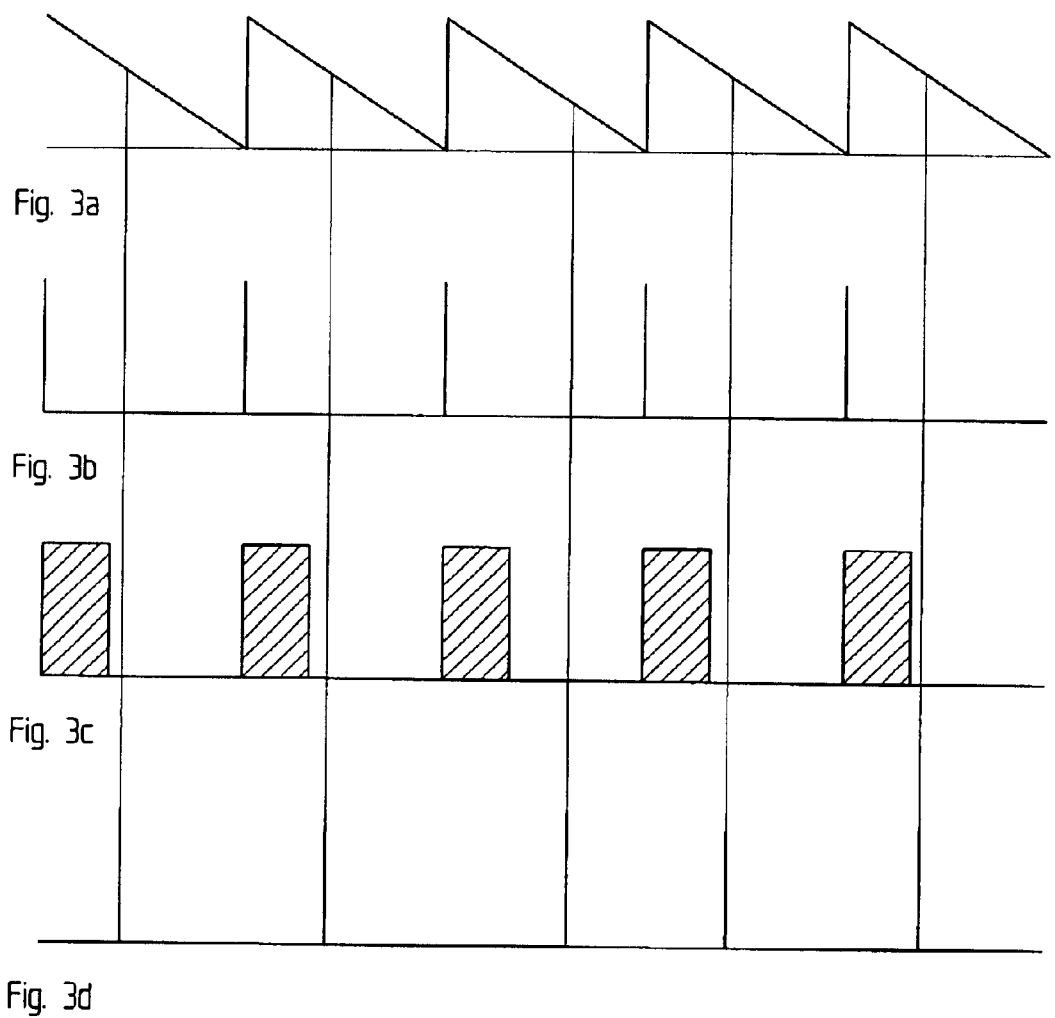

POSITION TRANSDUCER

This application is a Continuation of copending PCT International Application No. PCT/SE01/02313 filed on Oct. 22, 2001, which was published in English and which designated the United States and on which priority is claimed under 35 U.S.C. § 120, the entire contents of which are hereby incorporated by reference.

TECHNICAL FIELD

The present invention is concerned with devices such as angular transducers or encoders for detecting the position of a rotating shaft relative to a stationary part such as a chassis, in particular for detecting the angular position of a rotor or shaft of an electric motor/generator relative to the stator of the motor/generator.

BACKGROUND AND PRIOR ART

Important examples of high resolution encoders for motors are the EnDat series from the company Dr Johannes Heidenhain GmbH, 83301 Traunreut, Germany and SinCos systems from the company Max Stegmann GmbH, 78 156 Donaueshingen, Germany. Both permit a resolution of some million positions per turn by sending incremental analog position data in analog form while also providing the possibility to read absolute information in a serial digital format. The transmission of the analog signals used requires separate cabling between each encoder and the computer that controls the current sent to the motor. Such a cabling and the use of analog signals makes it simple to obtain a synchronisation between the time when the motor position is read and the time when the calculations for the next current controlling switch setting is performed. The analog position data are typically sampled in the same unit as calculates and sets the timing for the switches controlling the currents.

Presently used encoders for motor applications can be classified in two groups depending on if they have bearing system of their own or not. Encoders having an own bearing system can achieve very high resolutions at the expense of higher costs and a greater length in the axial direction of the motor. To avoid that the bearing system of the encoder creates large forces conflicting with the bearing system of the motor, the encoder chassis or rotor must be assembled against the motor using a flexible coupling. This normally makes the total system even longer and introduces possible resonances in the system.

Encoders without own bearings are limited to resolutions in the order of 8000 positions per turn against some millions for the high resolution devices. The company Renco and Danaher Controls, Gurnee, Ill., U.S.A., sells such encoders with the added benefit of integrated devices to adjust the position of the encoder disc relative to the encoder chassis during assembly. Such encoders normally transmit their information as digital incremental signals.

Angular transducers and encoders of a kind similar to those described herein are e.g. disclosed in the published International patent application WO 99/54683 and U.S. Pat. Nos. 5,998,783, 6,084,234 and 6,191,415 which are incorporated by reference herein.

SUMMARY

An object of the invention is to provide a high resolution encoder with a low cost for cable assembly.

Another object of the invention is to provide a high resolution encoder that can be connected through a cable bus system while permitting a good synchronisation between the time when the motor position is read and the time when the calculations for the next current controlling switch setting are performed.

Yet another object of the invention is to provide a high resolution encoder that can be connected through a cable bus system.

Yet another object of the invention is to provide a high position resolution encoder having a high resolution also in measuring speed by ensuring a precise and known time interval between position sampling events.

Yet another object of the invention is to provide a high resolution encoder having a low production and assembly cost.

Yet another object of the invention is to provide a high resolution encoder having a high noise immunity inherent in digital information transfer.

Yet another object of the invention is to provide a high resolution encoder having a short total length.

Yet another object of the invention is to provide a short encoder having a multiturn registration ability.

The objects above are achieved by the invention, the characteristics of which appear from the appended claims.

Thus generally, an encoder for detecting the angular position of a shaft of an electric motor comprises an encoder disc having one or more encoding tracks having variations of some detectable physically detectable quantity along the periphery of the disc. The variations are sensed by one or more detectors in one or more reading heads. Analog position signals from the detectors are sampled in sampling-and-hold devices to give analog values, the sampling times given by sampling pulses issued by a sampling pulse device, e.g. a counter. The sampled analog values are converted to digital values, e.g. by first being time multiplexed and then passing an analog-to-digital converter, and then provided to a local processor, a microprocessor calculating position values. The local processor sends commands to the sampling pulse device to issue sampling pulses at accurately defined times, which are normally regularly spaced in time. The local processor also receives, from a central processor, read command signals commanding to it provide position values. These read command signals normally arrive rather regularly but are not synchronised to the sampling pulses. In order to provide positions values at suitable times after receiving the read command signals, the local processor is arranged to send its commands earlier or later, in relation to the normal regular rate.

This can be made by calculating the interval between the time of receiving a read command signal and the time when the last command for issuing a sampling pulse has been given, comparing the interval to a set value dependent on the processing times in the various components that the detected analog signals has to pass to give the calculated position values and taking the appropriate action when the calculated interval differs too much from the set value.

Furthermore generally, when controlling an electric motor having a shaft, the following steps are performed:

1. The angular position of the shaft is detected, e.g. optically or magnetically, such as generally by detecting physical variations in an encoding track, and based on the detected angular position an output analog signal is provided.
2. At commanded times, which are set to basically appear regularly, i.e. with a constant time interval between, starts the deriving, from the output signal, digital values of the angular position at those commanded times, and after finishing the deriving, the digital values are used in the controlling, e.g. are immediately sent to a central processor.

3. Request pulses, each for requesting a derived digital value, are issued, the request pulses generally appearing regularly in time but sometimes having deviations therefrom and not synchronised with the commanded times and not with the constant time interval between the commanded times.

4. The time interval between the commanded times is made to deviate from the constant time interval when the time period from the time of starting of deriving a value to a time when next receiving a request pulse is not within a predetermined range. After the deviation having been made, the constant time interval is again used for setting the next commanded time.

Obviously then, in the case where the time period from the time of starting to derive a value to the time when receiving a next request pulse is shorter than a lower limit of the predetermined range, a next commanded time is made to occur later. In the corresponding way, in the case where the time period from the time of deriving a value to a time when receiving a next request pulse is longer than an upper limit of the predetermined range, a next commanded time is made to occur earlier.

In the case where at least two electrical motors are controlled, values of the angular position of the shaft of each motor are derived and then, the derived values are sent in a time multiplexed way on a single bus cable for controlling the motors.

Additional objects and advantages of the invention will be set forth in the description which follows, and in part will be obvious from the description, or may be learned by practice of the invention. The objects and advantages of the invention may be realised and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organisation and content, and of the above and other features thereof may be gained from and the invention will be better appreciated from a consideration of the following detailed description of non-limiting embodiments presented hereinbelow with reference to the accompanying drawings, in which:

FIG. 1a is a partly sectional view along the axial direction of a motor having two position reading heads included in an optical encoder, FIG. 1b is a front view as seen from the end of the motor of FIG. 1a showing the setting of the angular position of the two position reading heads, FIG. 1c is a partly sectional view similar to that of FIG. 1a along the axial direction but in a plane perpendicular to that of FIG. 1a showing electrical connections between light sensors, light sources and signal processing devices of the optical encoder, FIG. 2 is a block diagram of the high resolution signal processing part of the encoder of FIGS. 1a–1c, FIGS. 3a–3d are timing diagrams of signals and states of components of the high resolution signal processing part of the encoder of FIGS. 1a–1c, FIGS. 4a–4d are timing diagrams of signals and states of components of the high resolution signal processing part of the encoder of FIGS. 1a–1c illustrating the adaptation of an interval between sampling pulses.

DETAILED DESCRIPTION

Figures 4A, 4B, 4C, 4D:
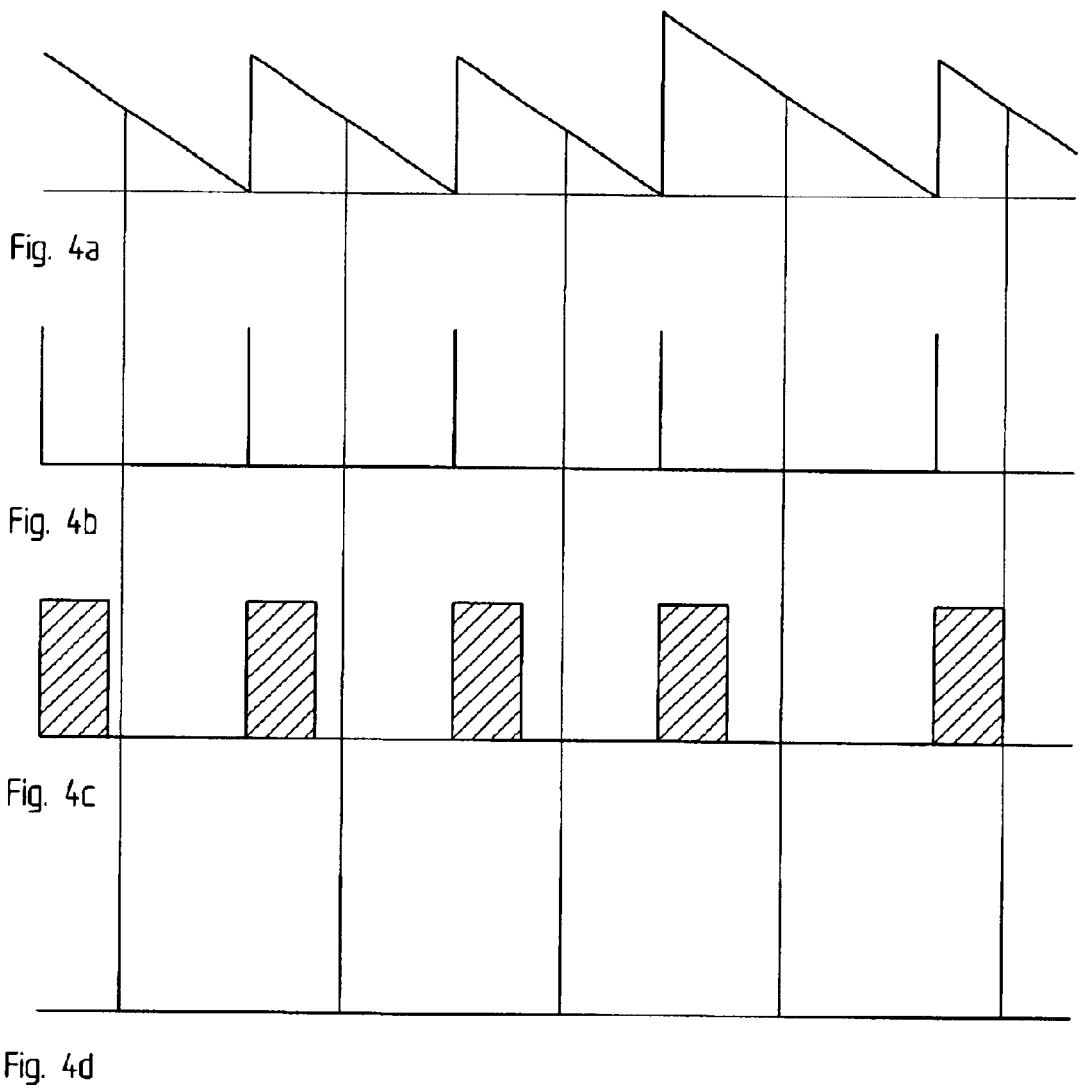

In FIG. 1a is shown, in a view perpendicular to an axial direction, two reading heads of an encoder for detecting the angular position of a rotatable part such as a shaft or a rotor of a motor. The encoder and related parts will hereinafter be described as mounted to detect the angular position of a shaft or a rotor of an electric motor/generator, the term electric motor used to also encompass generators. A encoder disc 101 is assembled to the motor shaft 102 using a hub 103 that presses against the rear motor bearing 104 in a way similar to that described for item 104 of FIG. 1 in the cited International patent application WO 99/54683. This gives a very stiff mechanical connection between the shaft or rotor and the encoder disc 101.

Figure 5:
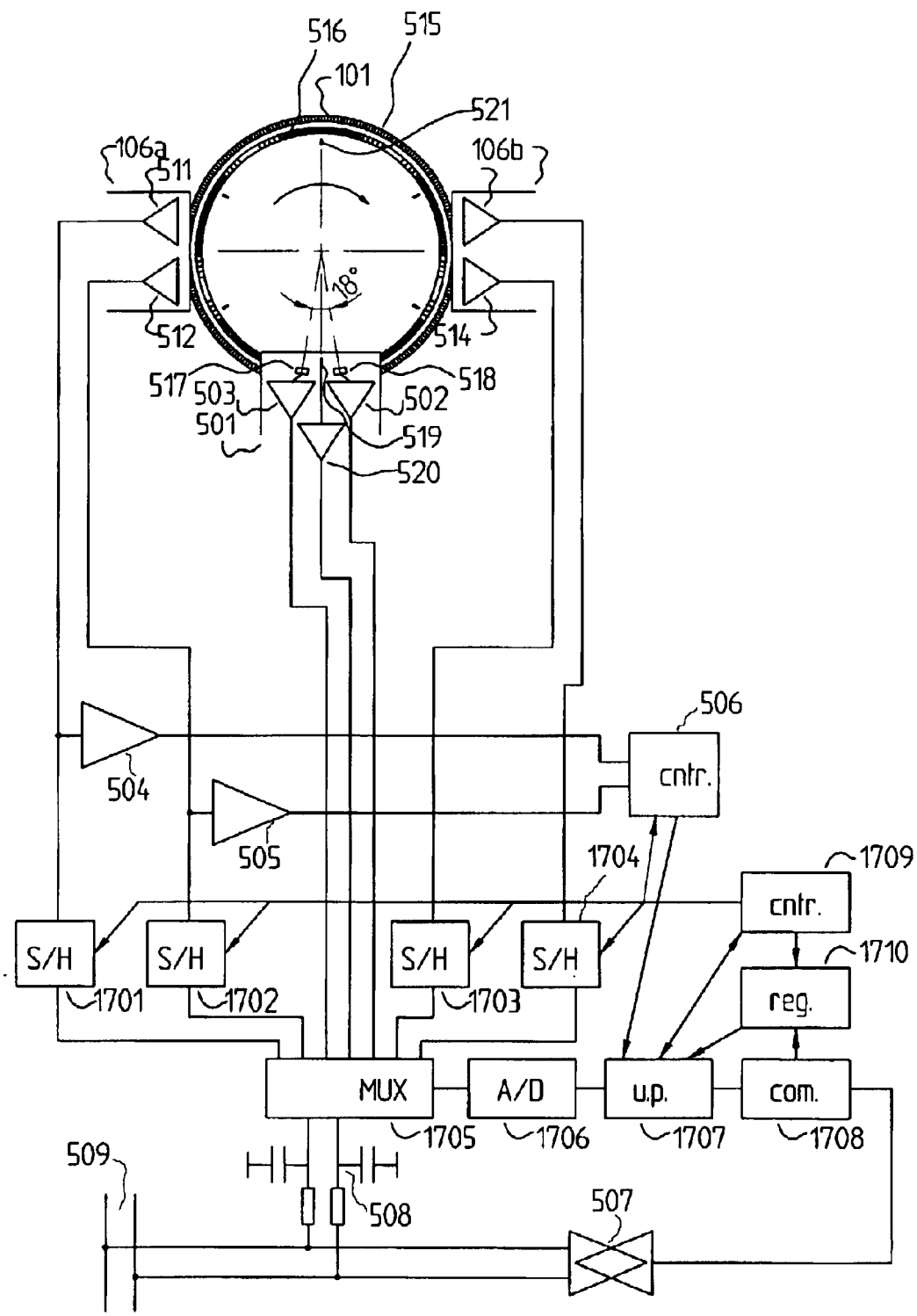
FIG. 5 is a more complete block diagram of an encoder.

The encoder disc 101 has one or more encoder or encoding tracks, see also FIG. 5. Light from at least one emitter/lens system 105 passes a track of the encoder disc 101 and is read by a reading head 106a or 106b including one or more photo receivers. The receiver in the head can advantageously have its photosensitive area configured in such a way that it acts as a combined mask and receiver. The signals output from the heads 106a, 106b are substantially sinusoidal.

Two light emitter/reading head combinations are provided, using the same incremental track of the encoder disc 101 for detecting the angular position. As described with reference to FIGS. 2, 3 and 4 in the cited U.S. Pat. No. 5,998,783, the summing of the position information from at least two such reading heads will cancel the effects of small radial movements of the encoder disc 101. Such movements are likely to occur as a consequence of the play in the bearings such as 104 and the various loads on the motor shaft 102.

The encoder has a stationary part or stator 107 that is radially centred relative to the motor rear end shield 108 by a flange 109 in the motor rear shield that fits the outside of the encoder stator 107 in a way similar to the assembly of resolvers.

In the view of FIG. 1b taken in an axial direction, i.e. parallel to the axial direction of the shaft 102, the mounting of the encoder stator 107 is seen. The encoder stator is axially centred relative to the motor rear end shield 108 by a flange 110 of the encoder stator that is by screws 111 pressed towards a flat surface in the motor rear shield. Elongated holes 112 are provided in the flange 110. This permits the encoder stator to be rotated in a way similar to the assembly of resolvers in order to adjust the phase of the signals from the encoder which are e.g. used for commutation of an electric motor to the phase of the emf. of the motor. In most applications, this alignment is achieved through the storing of parameters during a calibration run as will be described hereinafter.

In FIG. 1c is shown another view perpendicular to the axial direction, this view being taken in a direction also perpendicular to that of FIG. 1a. In FIG. 1c also the electrical connections between light sensors, light sources and signal processing devices are seen. The heads 106a, 106b that include the light sensors are assembled on a non-flexible PC (Printed Circuit) board 113 connected to a second non-flexible PC board 115 through a flexible PC strip 114. The light emitters/lenses 105 are placed on the board 115. Temperature sensitive devices shown at 118 are assembled on a third non-flexible PC board 117 and connected to the second PC board 115 through another flexible strip 116. The third board 117 can be mounted to a heat sink 119 that can be used as a rear end cover of the motor. A third combination of a light emitter 120 and receiver 121 uses light sent through another track, not shown, of the encoder-disc 101. This third combination is shown as a separate optical assembly but can alternatively be integrated in one or both of the reading heads 106a or 106b for detecting position in a high resolution.

FIG. 2 is a block diagram of the signal processing part of the encoder used for detecting the angular position with a high resolution. The encoder disc 101 can be assumed to have a track comprising in the conventional manner for example 1024 periods per full turn. The light passing through such a track of the disc towards the head 106a is captured by two photo receivers 511 and 512 comprised in said head which have their light sensitive surfaces arranged so that the signal from the receiver 511 is approximately 90 degrees out of phase from the signal from the other receiver 512, again in a conventional manner. Photo receivers 513 and 514 comprised in other head 106b are arranged to provide signals in a similar manner.

The signals from the high resolution receivers 511, 512 and 513, 514 are commonly or at the same instances sampled by sample-and-hold devices 1701–1704. The sampled values are then converted to digital form using a multiplexer 1705 multiplexing the signals in time and an analog-to-digital converter 1706. The digital values obtained are converted to angular positions by a microprocessor 1707 performing suitable calculations, possibly using corrections to handle non-sinusoidal shapes of the signals and varying amplitude for different angles of a full turn of the encoder disc as disclosed in the cited U.S. Pat. No. 6,191,415. The two signals indicating the position obtained from the head 106a and the head 106b are then added to each other in order to cancel out vibrations in the up-down directions of the encoder disc 101. Vibrations in the left-right directions will have negligible effect on the position signals.

The sampling commands or sampling pulses for sampling, at the same common times, in all the sample-and-hold devices 1701–1704 are issued by a device 1709 that advantageously is a counter, in particular a programmable divide by n counter, where n is a positive integer, the counter counting the pulses of the clock signal of the microprocessor 1707. Such a counter permits very precise sampling times and thereby very accurately defined periods or intervals between the sampling pulses. If position values of high resolution are obtained at highly precise times, a mathematical division of the detected movement by the time elapsed between the sampling pulses can give a very accurate estimation of the average speed during the interval.

Data on the position, or on the change in position during the interval, is sent to a central processor, see FIG. 7 to be described hereinafter, through a communication link, not shown in FIG. 2, connected to the communication unit 1708.

In the following "microprocessor" or "local processor" refers to a processor in an encoder, "central processor" to a processor controlling a system including one or more motors using a "communication link" and "current controller" to a processor controlling the switches that control the phase currents of an electric motor. The communication link is the bus type and can be used to transfer a wide set of commands. In the following, "synchronous position send command" or "read signal command" refers to a command on the communication link used to call for information on the position of the motor rotor to be used by the current controller to calculate the suitable current for a coming phase current switch period.

To permit the communication unit 1708 to work on a bus shared by other similar encoders and other devices, for example in a system for controlling several motors of a machine as will be described hereinafter, the periodic times when a synchronous position send command from the central processor will arrive at the communication unit 1708 will not always be quite regularly repeated, i.e. the time intervals between these commands are not always equal to each other, even if this the normal state, i.e. these commands are normally or mostly issued at regularly spaced times. It is however essential that the position signals from the photo receivers like 511 are sampled at known times having known intervals therebetween and that the sampling is done reasonably close to the times when the current controller starts its calculation of the electrical currents required for a coming time frame. This is arranged by a device or function that can identify a synchronous position send command.

A hardware device can be part of the communication device 1708, which sends a triggering signal to a register 1710 that on receiving the triggering signal directly copies the content of the sampling pulse issuing device or counter 1709 when a synchronous position send command is received by the communication device. An other alternative among many others is to let an interrupt software routine, triggered by data received by the communication device 1708 from the central processor, contain a short program that when executed checks whether the received data is a synchronous position send command and in that case reads and stores the current value hold in the device or counter 1709 used to generate the sample-and-hold commands.

This provides the encoder system with information of the extent to which the timing inside the encoder system fits the requirements of the current controller. Ideally, the timing of the operations performed by the encoder should be such that the position calculations made by the microprocessor 1707 are completed just before the command to send the position is received from the central processor. Whether this is true can be easily found by recording in the microprocessor 1707 the time intervals between the sample-and-hold commands or pulses sent to the sampling devices 1701–1704 or possibly the commands sent to the device 1709 commanding it to issue said pulses and the times of arrival of the triggering signals indicating the reception of a synchronous position send command from the central processor or possibly the times of receiving the synchronous position send commands. In the case where this interval differs too much from the ideal value, the next time interval for issuing the sampling pulses can be adjusted by a suitable amount, i.e. be made longer or shorter, the next pulse thus being issued earlier or later, in the later case delayed. The sampling times following the next time will however again have the normal time interval from the preceding sampling time. Only some sampling times should for a proper basic setting of the normal time interval between the sampling times be changed, such non-standard time intervals thus occurring rather seldom.

The information so obtained can be used in many different ways.

1. The encoder can send data on position and speed to the central processor. The microprocessor of the encoder always uses the relevant, currently valid interval between sample-and-hold pulses when calculating the speed. The calculated speed value will then be correct. This solution has the advantage that the central processor does not have to do any extra processing to handle the synchronisation.
2. The encoder can also send the deviation from ideal to actual time between sampling time and the time of command arrival. The central processor can then issue a command with a new interval between sampling pulses in order to keep the synchronisation. This solution has the advantage that the motor computer might know that the synchronous send command was delayed, for example due to retransmission of commands. The central processor may have a device similar to 1708–1709–1710 and can then compare the time delay from its sending of a correct synchronous send command to the period of its motor current control loop.
3. The encoder will adjust the sampling interval to remain in synchronisation. It will send position data and the sampling interval used since the previous synchronous position send command.

The time diagrams of FIGS. 3a–3d show the values hold by a programmable cyclic count down counter such as 1709, see FIG. 3a, the sample-and-hold pulses or commands as derived from said values, see FIG. 3b, the times during which the microprocessor 1707 calculates the position from the four analog values stored in the sample-and-hold circuits 1701–1704, see FIG. 3c, and the times when a synchronous position send command is received by the communication device 1708, see FIG. 3d. As appears from FIGS. 3a–3d, all but one of the synchronous position send commands arrive shortly after that the position calculations have been finished. The third synchronous position send command has been delayed.

The time diagrams of FIGS. 4a–4d show the values hold by a programmable cyclic count down counter, see FIG. 4a, the sample-and-hold pulses or commands derived from these values, see FIG. 4b, the times during which the microprocessor 1707 is engaged in calculating the position from the four analog values, see FIG. 4c, and the time when a synchronous position send command is received by the communication unit 1708, see FIG. 4d. As is observed in FIGS. 4a–4c, all synchronous position send commands, compare FIG. 4d, arrive at times having equidistant intervals therebetween. This interval length is however not identical to the internal, normally used sampling interval having a predetermined length, e.g. as set by the central processor, and shown in the three leftmost periods of the counter value as seen in FIG. 4a. The time period from the time when the position calculations have been finished to the synchronous position send command increases for every period. The fourth period shown is therefore prolonged to maintain the synchronisation. The period adjustment is exaggerated for the sake of clarity.

FIG. 5 is a more complete block diagram of an encoder also showing the handling of signals from low resolution tracks. As has already been said, the encoding tracks of the encoder disc can also comprise low resolution tracks. For reading the low resolution track a third reading head 501, also indicated at 121 in FIG. 1c, is provided detecting light issued by a suitable light emitter such as 120 in FIG. 1c.

The low resolution tracks can be absolute tracks or comprise two sinusoidal tracks 90 degrees apart with one or a few periods per turn. Alternatively, two sinusoidal tracks 90 degrees apart having the same number of periods as the pole pairs of the motor rotor can be used. In FIG. 5 a third alternative is shown comprising one track 516 with sinusoidal transparency having 5 periods per turn and with opto receivers 517 and 518 displaced 90 degrees out of phase, one period being equal to 360/5=72 degrees and 90 signal degrees being equal to 90/360*72=18 mechanical degrees. An electric motor having five pole pairs will have five complete commutation periods per turn of the rotor. A given reading of the position according to the five period track 516 will therefore directly give the information necessary for the commutation of the motor. If the encoder is assembled on a motor in a motor production line, the phase difference between the signals from the low resolution track and the emf from the motor can be detected during the test of the motor/encoder combination. The observed difference can be stored in the memory of the encoder microprocessor. This eliminates the need to angularly adjust the encoder to the motor stator by moving the encoder stator relative to the motor and would make the elongated holes shown at 112 in FIG. 1b unnecessary.

One or several reference pulses 521 can be added. They can be read by a photo receiver 519 and an amplifier 520. In the case of a low resolution track giving two sinusoidal signals 90 degrees apart with one or a few periods per turn, several reference pulses can be used. They must be so far apart that the low resolution sinusoidal signals can be used to identify one reference pulse from all other reference pulses even during unfavourable conditions in age, supply voltage, temperature, etc. The reference pulses 521 must be so short that each reference pulse can uniquely identify one and only one of the high resolution channel periods of channel 515. The six reference pulses like 521 shown in FIG. 5 can be easily identified from each other using signals from the track 516 since the positions of the six reference pulses will be 60 optical degrees apart when measured by the five period track 516.

The third reading head 501 comprises three photo receivers 517, 518, 519 having amplifiers 502, 503 and 520 connected to provide their output signals to the multiplexer 1705.

The encoder illustrated in FIG. 5 is suitable for the use of a low power standby mode as described in the cited U.S. Pat No. 6,084,234. A low power standby system requires a low resolution track. During high power mode, the high resolution track 515 is used for detecting the angular position. The low resolution track 516 is used for coarse positioning during low power mode and for commutation during the initial stages of high power mode. During low power mode, only the microprocessor 1707, the low resolution track optical receivers 517, 518, their amplifiers 502, 503, the multiplexer 1705 and the analog-to-digital converter 1706 must be active, and the microprocessor can possibly switch to a lower clock frequency. As described in the cited U.S. Pat. No. 6,084,234 the light source for reading the low resolution encoder channel can be switched on only periodically, which permits a continues recording of possible movements of the motor shaft during low power operation.

Battery backup can be provided using two power supply lines, one of which has battery backup, see FIG. 9 as will be described hereinafter. To reduce cabling, one power line can be used for both normal and battery supported power. In FIG. 5 means 508 to detect when a low power mode should be entered are shown. The data transmission lines 509 of a communication bus are through a receiver/transmitter buffer 507 connected to the communication device 1708 and are also connected to the multiplexer 1705 through two respective RC-networks 508. Assuming that the data transmission over the bus lines 509 uses signals according to the protocol RS485, at least one of the multiplexer terminals connected to the two RC-networks 508 will sense a voltage far above ground level. During standby mode, the central processor that normally drives the electric motor to which the encoder is attached is disabled and the lines can be kept at ground level using a pull down resistor, not shown. The two multiplexer inputs connected to the two RC-networks 508 will then sense a voltage essentially at ground level, indicating to the microprocessor 1707 that stand-by mode should be selected.

To track the high resolution position data, comparators 504 and 505 compare the level of each signal to a reference level symmetric between the positive and negative peak values of the sinusoidal signals and thereby convert the analog sinusoidal signals to conventional digital signals which in the conventional manner are fed to an up-down counter 506. This counter can advantageously have a capture register that stores the counter value at the same time as the sample-and-hold circuits are triggered; alternatively, the counter can be reset at the same time, thus only recording changes compared to the previous sampling command.

To get the correct position, data in the counter 506 representing quarters of a period of the primary signal data are to be combined with high resolution data obtained by processing the analog values captured by the sample-and-hold circuits 1701–1704, which give data on the fraction within one period of the primary signal data.

Figure 6:
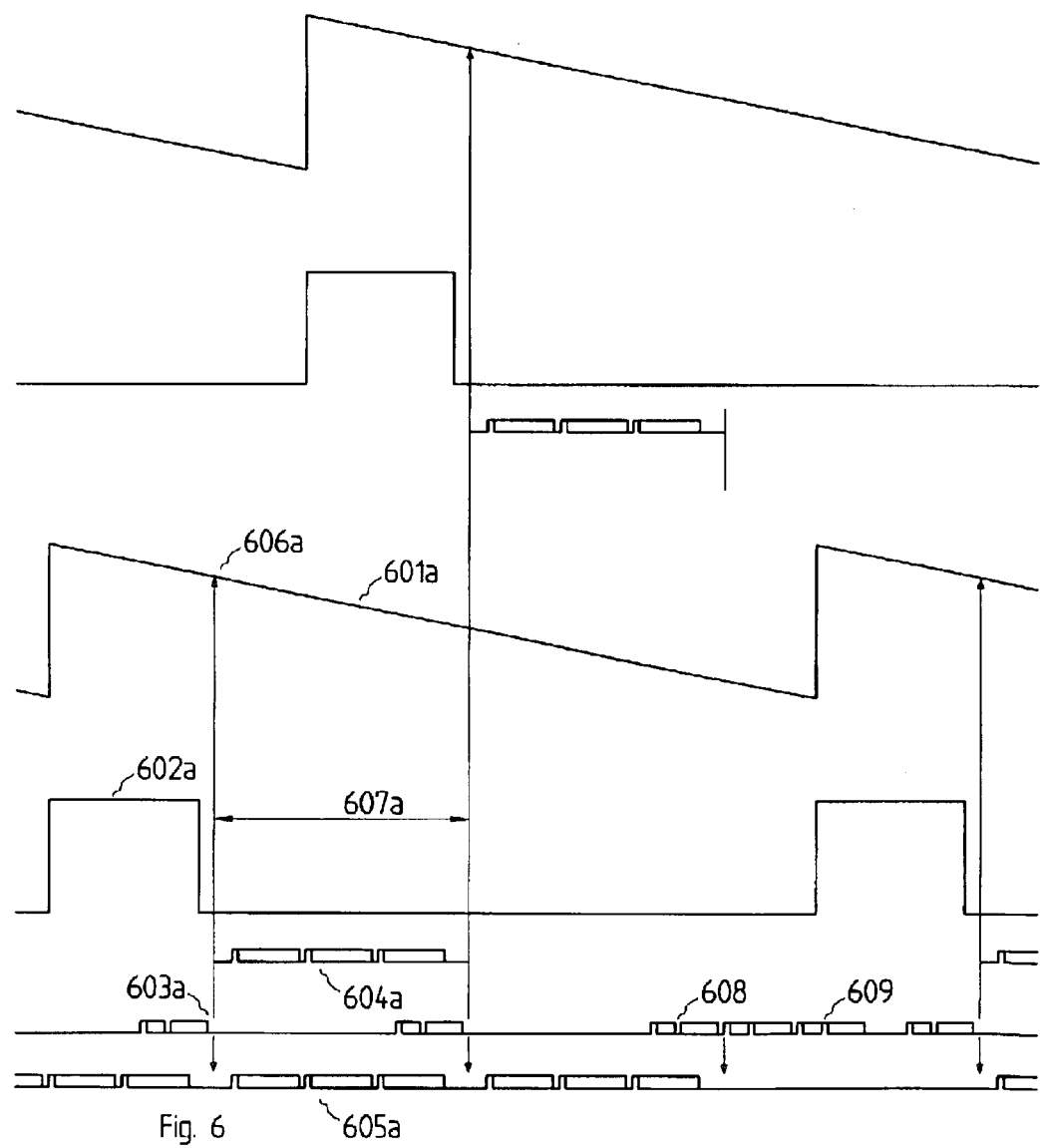
FIG. 6 is a timing diagram illustrating the data transfer in a system including two encoders using a common cable with separate command and response channels.

In FIG. 6 the data transfer in a system comprising two encoders A, B using a common cable with separate command and response channels with low data rates is illustrated by some waveform diagrams. The waveforms shown in FIG. 6 illustrate a system with a relatively low data rate. This can be advantageous to permit long cables with low shielding requirements in a high noise environment such as a welding robot. To reduce the amount of data, the data are preferably sent as differential data, i.e. the position data are sent as the difference since the previous sampling and the sampling interval is sent as the deviation from the sampling period initially agreed upon. For a resolution of 23 bits per turn, a maximum speed of 6000 rpm and a sampling interval of 250 microseconds, the value of the position difference between two successive sampling intervals will require 19 bits. If another two bits are added to permit three sampling intervals of for example 249, 250 or 251 microseconds and another three bits are allocated to identify the responding encoder, a total of 24 bits is required for a regulator loop synchronous position reply, i.e. the response signal including a position difference sent from the microprocessor of an encoder.

In FIG. 6, the signal 601a illustrates the value in the down counter 1709 in encoder A. Analog position data is sampled on the rising flank of the signal 601a and the data obtained is processed during the time interval 602a directly following the sampling time. At 603a the transmission of the synchronous position request command from the central processor is indicated. The end of the stop bit from this single byte command generates an interrupt at time 606a. This interrupt will identify the received command byte in the communication device 1708 as a synchronous position send command for encoder A. The encoder A then enables the encoder A respond channel three state driver such as 507 during a period 607a. It will also read the value of its down counter value 601a to check whether the down counter is in synchronisation with the central processor. The position difference will be sent as a three byte word 604a, which is driven out on the reply channel as indicated at 605a. In the following time slot used by the central processor, the same command is sent to encoder B.

If the absolute position range is set to 64 bits, this permits a 23 bit resolution of one turn within a maximum of plus or minus 6000 turns per minute during 348 years. At a modest 1 Mbaud data rate for the communication link with six time slots during a 250 microsecond cycle, five encoders can transfer their 24 bit differential position data during 5 time slots, still permitting the sixth slot to transfer absolute position, motor temperature and encoder temperature for all five encoders at more than 100 times per second.

The third time slot in FIG. 6 is used for auxiliary information, for example to read a part of the absolute position or temperature data from a selected encoder. In the third slot shown in FIG. 6, the central processor sends a parameter address. It consists of a command byte, all of which has one bit, pointed at by arrow 608, low, while the two address bytes such as 609 has the corresponding bit high. This permits an address of 14 bits to be sent to one of the encoders as a data pointer that can be used by a later parameter read or write command. For example, a certain value of this address may indicate the temperature sensor. To read the temperature of the motor connected to encoder A, the third slot would first contain a command to motor a to set its data pointer to point at the temperature reading, and the following third slot would contain a command to encoder A to send the data indicated by the previously sent data pointer.

Figure 7:
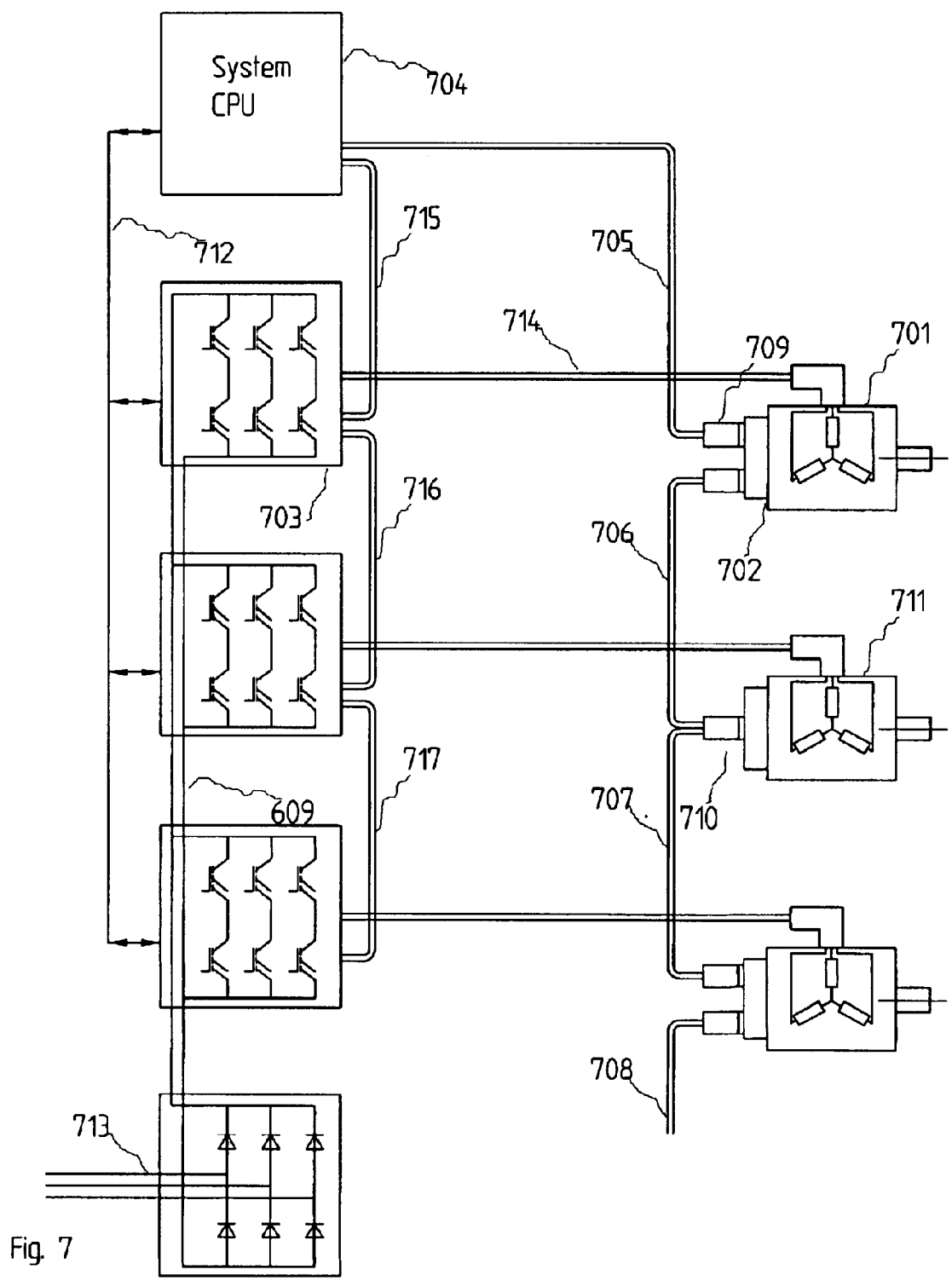
FIG. 7 is a block diagram of a system including three motors provided with encoders, three motor current controllers and a common system central processor that communicates with the encoders over a common bus cable.

FIG. 7 is a diagram of a system, e.g. a robot control system, having three motors such as 701, each one provided with an encoder 702, three motor current controllers 703, one for each motor, a common power supply 713 and a common central processor 704 that communicates with the encoders over a common bus cable 705, 706, 707, 708. Commercial installations will depend on the connector structure supplied by the supplier of the encoders in the system and will therefore use the same connection structure on all motors. The bus cable installation is illustrated to be provided with connectors to the motors according to two alternative embodiments. For the motor 701, the cabling consists of separate parts comprising two connectors like 709 for one encoder. These two connectors are interconnected inside the encoder, and the different cable parts like 705 and 706 are therefore mechanically separated but galvanically interconnected. This has advantages in installations where the motor connectors must have a high protection or shielding class. The connection for the motor 711 has a single connector provided with two cable ends connected to each other in the connector 710. This saves connectors but has the disadvantage that the whole cable must be assembled as one piece having several connectors.

Each current controller like 703 is connected to one motor like 701 over a separate current cable like 714.

The central processor 704 issues the synchronous position send commands over the communication link cable 705, 706, 707, 708 and receives the position replies from the encoders on the same cable. This information is processed and used to issue current commands to the current controllers, for example to permit a robot hand or a machine tool to follow a required path. The means employed to issue the current commands from the central processor 704 to the current controllers like 703 are illustrated as a bus 712. There are several standards for such control structures, such as SERCOS.

The communication link cable 705, 706, . . . may also be connected to each current controller like 703 so that each current controller gets direct information on the position of its associated motor. In FIG. 7 this is shown as cables 715, 716, 717. This is suitable when the controllers are controlling movements with lower requirements for synchronism. In such cases the central processor 704 may issue more general commands to each current controller 703. Many present current controllers like 703 have a processing capacity required to execute commands for complete movements. If the communication link cable 705, 706, . . . is connected to both the central processor 704 and the motor current controllers like 703, the motor controllers can use the replies to the synchronous position commands to control the movement of its associated motor whereas the system central processor can use the same information to monitor the movements already commanded and to decide when it is appropriate to issue commands for other actions. The commands between the central processor and the motor current controllers can in such cases also be sent over the communication link cable 705, 706, . . . This would require a higher bandwidth than that used for case illustrated in the diagram of FIG. 6.

The current controllers like 703 can use the synchronous position send commands to synchronise their current loops in the same way as that described above for the encoders. In this way, the synchronous position send commands from the system central processor 704 can be used to synchronise both the encoder 702 and the current controller 703 so that recent position data from the encoder 702 will be available when setting the current flowing from current controller 703 for the next time slot.

Auxiliary sensors may be connected to the bus cable 705, for example using the uncommitted end 708.

Although the timing diagrams of FIGS. 3a–4d illustrate a case where the sample-and-hold circuits 1701–1704 are triggered only once for every synchronous position send command, it is often advantageous to trigger the sample-and-hold devices several times during one motor current switch period. This permits calculation of speed information on more recent data. Another use of a more frequent sampling is the possibility to calculate the speed using the same flank of the same primary signal. The sample-and-hold timing generator can then issue signals as described with reference to FIGS. 3a–4d synchronous to the synchronous position send commands, but also another set of signals synchronous to the frequency of one of the primary signals. At high speeds, this permits the speed to be calculated using approximately the same part of the same steep flank of the same one primary signal to calculate the speed. In this way, the effects of signal distortion and phase lag at high frequencies of the primary signal can be cancelled out.

The embodiments shown above are based on optical primary signals using variations in opacity between different sectors of an optical encoder disc. The basic principles of synchronisation can also be applied to primary signal sources based on variations in electrical conductivity, permeability or magnetic coercitivity.

Figure 8:
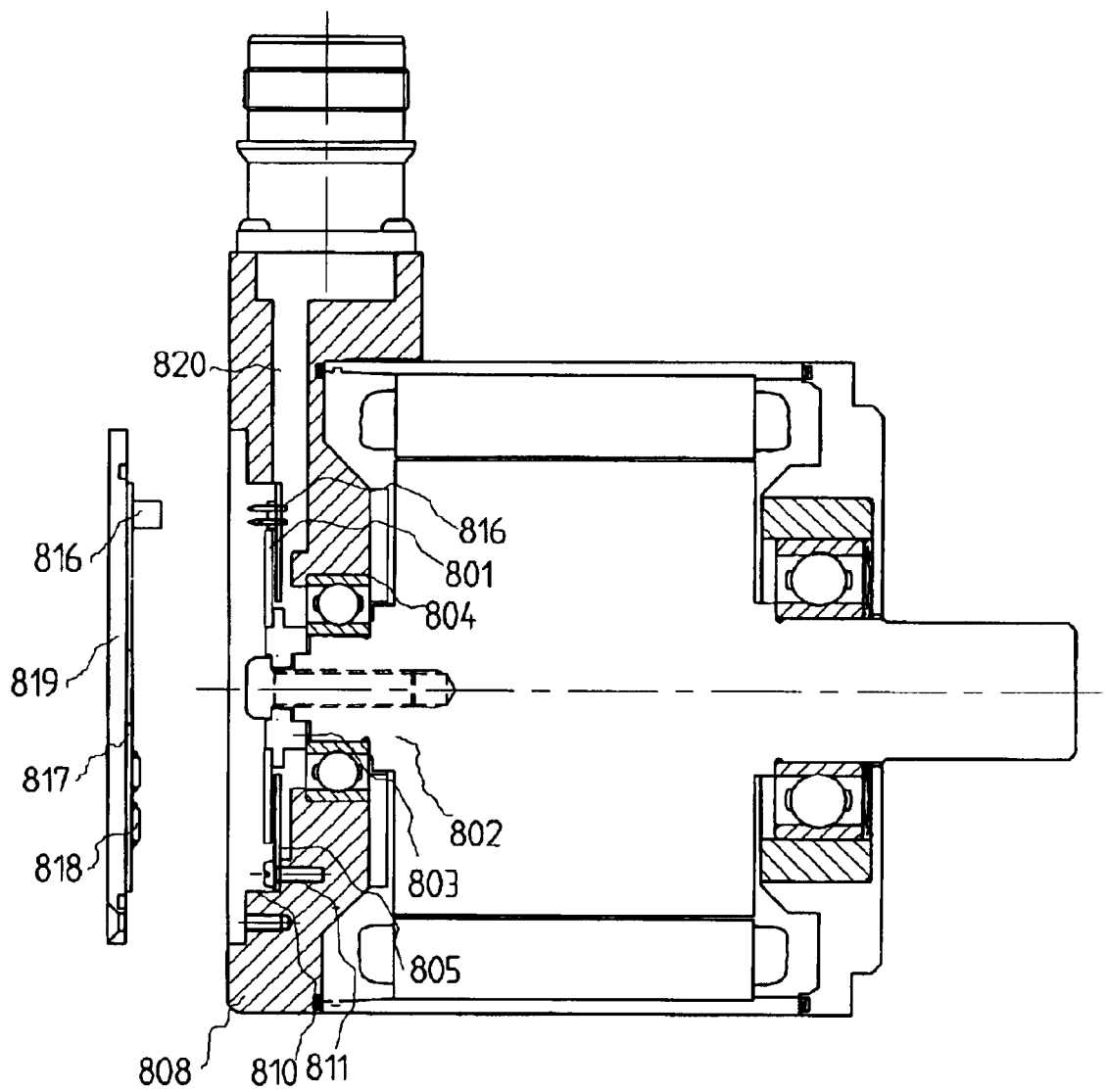
FIG. 8 is a sectional view of the assembly of an encoder using non-optical primary signals.

FIG. 8 is a sectional view showing an assembly of a non-optical encoder system. A modulator disc 801 is assembled to a the shaft 802 of an electric motor using a hub 803 that presses against the rear bearing 804 of the motor in a way similar to that described for item 104 of FIG. 1 in the cited International patent application WO 99/54683. This gives a very stiff connection between the motor rotating shaft and the modulator disc 801.

The magnetic field from a set of primary coils in the coil board 805 is affected by metallized sectors on the modulator disc 801 so that the sign and amplitude of voltages induced in two reading coils in the coil board 805 vary with the position of the modulator disc in a conventional prior art manner. For the purpose of commutation of the electric motor, the number of periods per turn of this signal should be the same as the number of motor poles or an integer fraction thereof, such as 1, 2 or 4 for an 8-pole motor. In order to obtain higher resolutions, a second coil set with for example 16 times more periods per turn than that of the commutation coil set can be added.

The coil board 805 is radially centred relative to the motor rear end shield 808 by a flange 810 in the motor rear shield 808 that fits the outside of the coil board 805 in a way similar to the assembly of resolvers. The coil board 805 is pressed towards a plane in the motor rear shield by screws 811.

Thermally sensitive devices shown as 818 are assembled on a PC board 817 and connected to the coil board 805 through a connector 816. The board 817 can then be assembled on a heat sink 819 that can be used as a rear end cover of the motor. The assembly 816–818 is shown before mounting. Connection to the outside world can be done through cables from the coil board 805 through the channel 820 in the motor stator.

Figure 9:
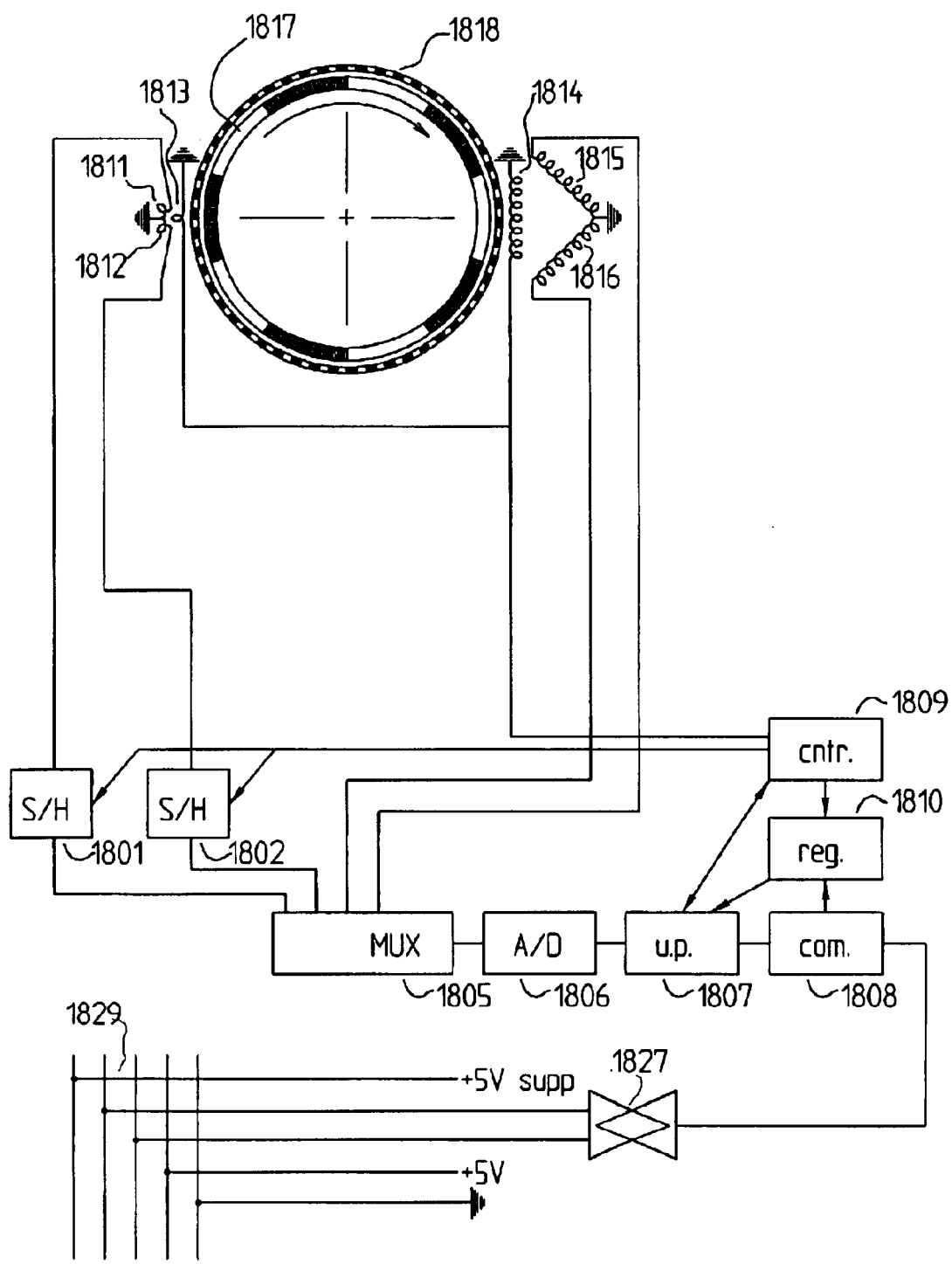
FIG. 9 is a block diagram of the encoder of FIG. 8.

FIG. 9 is a block diagram of the signal processing part of the transducer. The modulator disc 801 has in the conventional manner a low resolution track 1817 with for example one or as shown five periods per full turn. The magnetic field from a set of primary coils 1814 in the coil board 805 will be affected by metallized sectors 1817 on the modulator disc 801 so that the sign and amplitude of voltages induced in two reading coils 1815 and 1816 in the coil board 805 vary with the position of the modulator disc in the conventional way. The ground symbols in FIG. 5 denotes signal base voltage, which in a 5 Volt single supply system normally would be 2.5 or 2.048 Volts. For clarity, the coils are drawn as if they covered only a small section of arc. They should preferably cover the whole circumference, i.e. a full turn.

The modulator disc 801 may also have another higher resolution track 1818 with for example 50 periods per turn as shown. The magnetic field from another set of primary coils 1813 in the coil board 805 will be affected by metallized sectors 1818 on the modulator disc 801 so that the sign and amplitude of voltages induced in two reading coils 1811 and 1812 in the coil board 805 vary with the position of the modulator disc in the conventional way.

The signals from the high resolution receivers are simultaneously sampled by sample-and-hold devices 1801–1802. The values are then converted to digital form using a time multiplexer 1805 and an analog-to-digital converter 1806. The values obtained are converted to angular position values by the microprocessor 1807, possibly using corrections to handle non-sinusoidal shapes of the signals output from the coils and varying amplitude for different angles of a full turn of the modulator disc as disclosed in the cited U.S. Pat. No. 5,998,783.

The signal processing is made in the same way as described above for optical encoders.

The tasks of the encoder microprocessor 1707 can be summarised against the background of the partial explanations given in the texts accompanying the figures above.

At the initial assembly of the encoder on a motor, a test run can be made. In such a test run, the emf. from the motor windings, the real angular position as given by a precision high resolution encoder in the calibration station and the signals obtained from the various tracks can be recorded. This information can be used to get parameters for a linearisation of the high resolution tracks as described in U.S. Pat. No. 6,191,415. The same calibration setup can be used to get a relation between the high resolution track periods and the low resolution channel and between these two and reference pulses.

When the motor is assembled in a machine and the power is switched on, the microprocessor may receive commands to define the conditions to be used in the system. This may include the basic communication or commanding principle, for example a selection between the three basic principles given as alternatives 1. to 3. in the description with reference to FIG. 3 above. If alternative 3. is given, the standard sampling period, for example, 250 μs, and adjustment periods, for example 249 and 251 μs, can be defined.

At the first power up, the microprocessor can read the high and slow resolution tracks 515 and 516 to get the approximate position. It must also initiate the counter 506 to initially be in synchronism with the first synchronous position send command received.

The position read from track 516 will be sufficient to obtain the correct commutation of the motor. The position read from track 515 will permit an excellent speed control of the motor as the speed will be estimated from the movement of the high resolution track between two sampling commands from the counter 506. The resolution of track 516 may not be high enough to uniquely identify the period from track 515. By turning the motor slowly a reference pulse such as 521 will be found. This will permit a unique identification of the period of track 515. By slowly moving to a mechanically fixed end position, the relation between data from the encoder and positions of the machine can be established.

When the machine is switched off, the encoders will enter a low power mode. The microprocessor can then periodically enable the light source for the low resolution track 516 and can thereby detect movements that eventually were forced on the machine during power off. When the machine is switched on again, the microprocessor can use the data from the low resolution track and its recorded history to get the coarse position, for example 212.42+−0.08 whole low track periods from the mechanical end stop established during the first power on. In this stage the encoder can give a high resolution position that however can be wrong with one a few periods of the high resolution channel.

In the case shown in FIG. 6, speed data are independent of the reference pulse. The central processor can therefore command the motors to move slowly for a fraction of a turn and then stop. As soon as the encoder microprocessor detects a reference pulse, the encoder microprocessor knows the correct position. The exact position can then be read by the central processor using the slower communication of the third slot in FIG. 6.

During a normal period of counter 1709, the microprocessor will run background tasks such as temperature control until an interrupt from the counter 1709 occurs. The microprocessor 1707 will then read data from counter 506 to get the approximate angular position. It will also read the receivers 511–514 using the multiplexer 1705 and the analog-to-digital converter 1706. The angular position and analog receiver data will be entered into an algorithm using calibration constants obtained during the factory calibration of the motor/encoder combination to get the angular position of the disc 101 relative to heads 106a and 106b. By taking the average of these and adding that to the counter 506, the angular position is obtained. By subtracting the previous position the movement during the preceding time slot is obtained. The data for the next reply to a synchronous position reply command as given in FIG. 6 can thereby be made ready by including information on the counter period recently used by counter 1709.

The microprocessor will get an interrupt from the counter 506 communication receiver 1708 when data arrives from the central processor. It then checks if the input data refers to its own encoder identification. If the data received was a synchronous position send command, it will send the reply already prepared. It also reads the content or capture register 1710 to check whether it still is in synchronism with the central processor and sets the data to be used for the following period of counter 1709 accordingly.

While specific embodiments of the invention have been illustrated and described herein, it is realised that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of controlling an electric motor having a shaft, comprising the steps of:
   detecting the angular position of the shaft and providing based on the detected angular position an output analog signal,
   deriving, at commanded times, from the output signal digital values of the angular position and using them in the controlling,
   providing request pulses for requesting a derived value,
   the commanded times appearing with a constant time interval between them except when the time period from the time of deriving a value to a time when receiving a request pulse is not within a predetermined range.

2. A method according to claim 1, characterized in that in the case where the time period from the time of deriving a value to a time when receiving a request pulse is shorter than a lower limit of the predetermined range, a next commanded time is made to occur later, and that in the case where the time period from the time of deriving a value to a time when receiving a request pulse is longer than an upper limit of the predetermined range, a next commanded time is made to occur earlier.

3. A method according to claim 1 for controlling at least two electrical motors, characterized in that for each motor values of angular position of their respective shaft are derived and that the derived values are sent in a time multiplexed way on a single bus cable for the controlling.

4. An encoder for detecting the angular position of a shaft, comprising:
   an encoder disc rigidly attached to the shaft and having at least one first encoding track,
   at least one detector for detecting variations in the first encoding track and providing an analog position signal, characterized by
   a sample-and-hold device connected to sample the analog position signal to provide sampled analog values,
   a sampling signal device issuing sampling pulses to the sample-and-hold device commanding it to make a sample,
   an analog-to-digital converter connected to the sample-and-hold device for converting the sampled analog values to digital values, a local processor connected to the converter for receiving the digital values and therefrom calculate and provide position values and further connected to the sampling signal device for sending to it commands to issue sampling pulses at following, accurately defined times, the local processor arranged to receive read command signals commanding to it provide position values and to delay the command to issue a sampling pulse in the case where the interval between the previously issued sampling pulse and a thereafter received read command signal is too small or to issue it earlier in the case where the interval is too large.

5. An encoder according to claim 4, characterized in that the local microprocessor is connected to or includes a clock circuit issuing a clock signal including clock pulses, and that the sampling signal device comprises a counter counting the clock pulses.

6. An encoder according to claim 5, characterized in that the sampling signal device comprises a programmable divide by n counter, n being a positive integer.

7. An encoder according to claim 5, characterized by a register for storing the content of the counter on receiving the read command signal.

8. An encoder according to claim 4 connected to the shaft/rotor of an electric motor, characterized in that the encoder comprises a low resolution track and a low resolution detector used to provide signals for coarse positioning in a low power mode of the motor and/or for commutation during initial stages of a high power mode.

9. An electric motor system including:

a central processor, at least one electric motor, the electric motor having a shaft and including:
  an encoder for detecting the angular position of the shaft, comprising:
    an encoder disc rigidly attached to the shaft and having at least one first encoding track,
    at least one detector for detecting variations in the first encoding track and providing an analog position signal,
  the encoder further characterized by
    a sample-and-hold device connected to sample the analog position signal to provide sampled analog values,
    a sampling signal device issuing sampling pulses to the sample-and-hold device commanding it to make a sample,
    an analog-to-digital converter connected to the sample-and-hold device for converting the sampled analog values to digital values,
  a local processor connected to the converter for receiving the digital values and therefrom calculate and provide position values and further connected to the sampling signal device for sending to it commands to issue sampling pulses at following, accurately defined times,
  the local processor connected to the central processor to receive therefrom read command signals commanding to it provide position values and to delay the command to issue a sampling pulse in the case where the interval between the previously issued sampling pulse and a thereafter received read command signal is too small or to issue it earlier in the case where the interval is too large.

10. An electric motor system according to claim 9, characterized by at least two electric motors, each including an encoder, local processors of the electric motors connected to the central processor through a single bus line for receiving read command signals on the bus line.

* * * * *